J. W. LATCHER.
Car Brake.
No. 46,366. Patented Feb. 14, 1865.
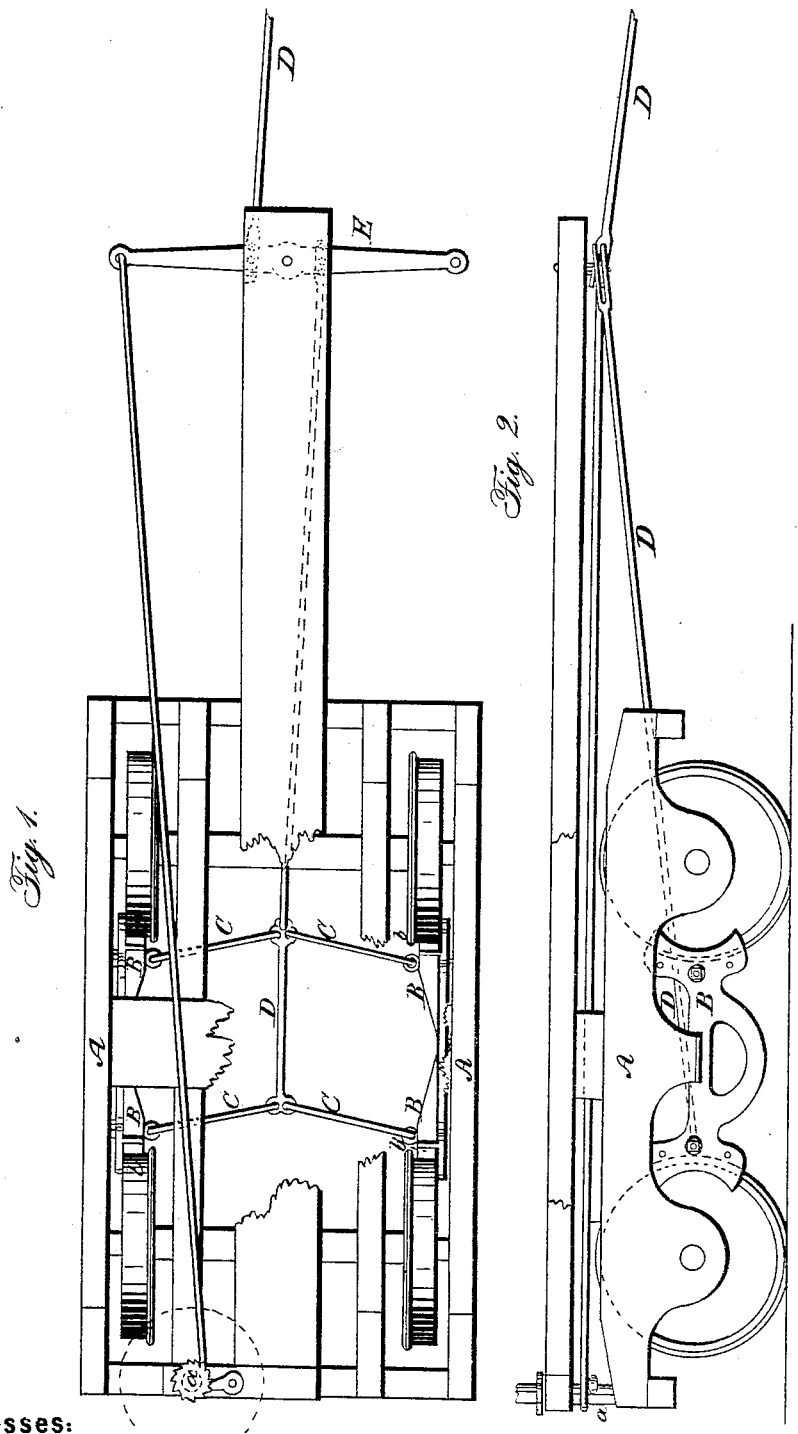
Witnesses:
Edward Jones
Alfred Harley
Inventor:
J. W. Latcher

UNITED STATES PATENT OFFICE.

JOHN W. LATCHER, OF NORTHVILLE, NEW YORK.

IMPROVEMENT IN RAILROAD-CAR BRAKES.

Specification forming part of Letters Patent No. 46,366, dated February 14, 1865.

*To all whom it may concern:*

Be it known that I, JOHN W. LATCHER, of Northville, county of Fulton, and State of New York, have invented a new and Improved Railroad-Car Brake; and I do hereby declare that the following is a full, clear, and exact description of the same, reference being had to the annexed drawings, making a part of this specification, in which—

Figure 1 is a horizontal plan of the truck with the brake attached; and Fig. 2 is a side elevation of the same, exhibiting the longitudinal position of the brake-plate B.

The end that this brake is designed to accomplish, first, is its non-liability to get out of order, owing to the simplicity of its construction, and also, that the greatest strain or force required to impede or stop the wheels acts upon each end of single pieces of an iron plate, B, or shoes secured upon the inside of the said plate; and, second, owing to the concavity of the shoes corresponding with the convexity of the wheels, it cannot, therefore, fall upon the track, should some of its minor parts give out, as is the case with other brakes.

A represents a car truck.

B B are the brake-plates, which are hinged on flat centers, equidistant from the centers of the wheels. The center is made flat in order that when the brake is not in use the plates B B will rest parallel to the wheel-piece A and free from contact with the wheels. The plates B B oscillate or rock with the wheels, when they are pressed or forced against the said wheels and toward each other in a lateral direction by means of the toggle-links C C and connections D D, attached to the brake-standard *a* or other point from whence power is communicated. When the brake-plates B B are forced to rock by their contact against the side of the wheels, as shown, the brake-shoes *b*, which are secured immediately in front of the tread of the wheels on said plate, produce an extra frictional surface, and therefore have a greater tendency to impede or stop the rotation or revolution of the wheels. The brakes on the two trucks are connected together by means of the rods D D and lever E, placed centrally between the two trucks. When the power is removed from the brake, the links C C are straightened in a line parallel with each other and carry from each other the plates B B, thus clearing the wheels. This latter movement is effected by the use of a spring, *c*, as shown in the drawings.

What I claim as my invention, and desire to secure by Letters Patent, is—

1. The employment or use of the rocking or oscillating plates B B, placed on suitable centers, and longitudinally to the truck, and centrally between and in front of the wheels, and actuated by means of the links C C toward each other and against the wheels, in the manner and for the purpose substantially as described.

2. The use of the toggle-links C C, in combination with plates B B, for the purpose of rocking or actuating the plates B B, as set forth.

J. W. LATCHER.

Witnesses:
 EDWARD H. JONES,
 ALFRED HARLEY.